United States Patent [19]

Lainer

[11] Patent Number: 5,358,407
[45] Date of Patent: Oct. 25, 1994

[54] APPEARANCE MODIFICATION DISPLAY/SELECTION SYSTEM AND METHOD

[76] Inventor: Lisa M. Lainer, 22 Fieldstone Dr., Mansfield, Mass. 02048

[21] Appl. No.: 902,832

[22] Filed: Jun. 23, 1992

[51] Int. Cl.$^5$ .................. G09B 19/10; G09B 19/00
[52] U.S. Cl. ................................. 434/94; 434/99
[58] Field of Search ............. 434/94, 371, 377, 399, 434/99, 100; 132/333, 319

[56] References Cited

U.S. PATENT DOCUMENTS

| | | | |
|---|---|---|---|
| 1,191,144 | 3/1916 | Baldauf | 434/371 |
| 2,085,180 | 6/1937 | Bevis | 434/371 |
| 2,309,390 | 1/1943 | Grossguth et al. | 434/94 |
| 2,921,387 | 1/1960 | Reeves | 434/94 |
| 3,339,453 | 9/1967 | Udich | 434/94 X |
| 4,258,478 | 3/1981 | Scott et al. | 434/94 |
| 4,297,724 | 10/1981 | Masuda et al. | 434/94 X |
| 4,731,743 | 3/1988 | Blancato | 364/521 |
| 4,776,796 | 10/1988 | Nosal | 434/94 |

FOREIGN PATENT DOCUMENTS 0298923 1/1989 European Pat. Off. ............. 434/99

*Primary Examiner*—Gene Mancene
*Assistant Examiner*—Cindy A. Cherichetti
*Attorney, Agent, or Firm*—Donald W. Meeker

[57] ABSTRACT

A selection of scaled photographic images of appearance modifications are printed with opaque backing on clear transparent overlay sheets. An instant color photograph of a user is removably attached by Velcro to an opaque carrier page. The overlay sheets each overlay the carrier page one at a time to view what the user would look like with the appearance modifications. Overlay sheets are bound together in a spiral binder to permit ease of use and storage and updating with replaceable pages. A scaled viewing guide slides removably into a slotted U-shaped holder around the camera viewfinder. Additional views of the appearance modifiers viewed from different angles and information and images of products related to the appearance modifiers may be printed on each overlay sheet. Appearance modifiers include new hair styles and colors, hair transplants, wigs, toupees, head adornments such as hats and bridal headpieces, facial adornments such as makeup and glasses, facial reconstruction and other proposed changes in appearance. The method of the invention includes photographing appearance modifiers on mannequins of opposite tone to the modifiers with matching backgrounds to the mannequins. In printing the images of the appearance modifiers on the overlay sheets, a shade selection and elimination process eliminates the mannequins and background from the printing process, thereby leaving the "floating" image of the appearance modifier on the clear overlay sheet.

19 Claims, 1 Drawing Sheet

APPEARANCE MODIFICATION DISPLAY/SELECTION SYSTEM AND METHOD

BACKGROUND OF THE INVENTION

1. Technical Field

The present invention relates to educational devices and to article and surface demonstration devices concerned with toiletries, and in particular to a personal appearance modification display and selection system enabling an individual to view proposed changes in appearance in advance of the changes by overlaying transparent sheets imprinted with images of the proposed appearance modifiers over an appropriately sized instant photograph of the individual to compare a variety of proposed appearance changes as they would look on the individual.

2. Background Art

Considering a change in appearance with a different hairstyle, hair color, custom-made wig or toupee, hair transplant, cosmetic surgery, custom-made hat, bridal or other headpiece, custom eyeglasses, or any other major change affecting the facial appearance is a major concern for individuals, with considerable uncertainty in the outcome surrounding such change. Selecting such an appearance modification is a personal and very important decision. What looks attractive on one individual may look horrible on another. Therefore, the practice of having individuals select a new appearance modifier based upon looking at others or pictures of others with the appearance modifier may turn out to be a disaster because of the difference in the individual's facial structure, coloring, features or any of a number of unique physical characteristics. The ideal situation is for each individual actually to be able to see the appearance modifier on himself or herself before making the change.

In the case of a hat or other off-the-shelf article, a person may try on the article and look in the mirror. But in the case of a new hairstyle, custom designed article, plastic surgery or other proposed modification of appearance without try-on capability, individuals must rely on other means to visualize how the change will affect their appearance.

Prior art systems provide for visualizing make-up or hairstyles on indivduals, but they involve very expensive and elaborate equipment including videos and computers to transpose an image of a hairstyle onto an image of a customer. At least one worker is required to operate the elaborate prior art systems, sometimes requiring the worker to have artistic talent in creating the image of the customer with a proposed hairstyle. Viewing each hairstyle requires a technically detailed and time-consuming task of electronically transposing one image on the other. To produce each image requires several minutes. And each image costs the customer a substantial sum of money. Usually the number of images is limited because of the time factor involved as well as the expense.

Video imaging systems all have a visual acuity problem because of the nature of the image comprised of a number of dots flashing across the screen. The quality of the image is somewhat blurry at best even with an expert technician. More often the problem is compounded because of nonexpert operators producing very blurry video images and unnatural color, particularly in the flesh tones and hair colors, the no most crucial factors in making a hairstyle selection.

The prior art video hairstyle selection systems are out in public display for all in the hair salon to see, and often attracting considerable attention while a customer is making a selection. This public showing of a customer with an unflattering hairstyle is very embarrassing to the customer.

Photographs of the video image of the customer with the proposed hairstyle are usually quite fuzzy due to the imperfect nature of the video image which does not lend itself to photographing.

The inventor's own prior art system described in U.S. Pat. No. 4,776,796 requires mounting images of hairstyles on a page and inserting an instant photograph into narrow slots to view each hairstyle, which may be somewhat time consuming and frustrating as well as causing damage and wear to the slot through repeated usage. The invention in the patent was also intended primarily for hairstyle changes with a system and method appropriate for viewing proposed new hairstyles.

DISCLOSURE OF INVENTION

The present invention overcomes the problems involved with the prior art and produces a more effective and desirable solution to the problem of viewing proposed appearance modifications and selecting an appropriate choice for a desired new appearance for each individual.

A simple inexpensive system allows an individual to select a choice of appearance modifiers which will look attractive without incurring considerable expense in the selection process. Appearance modification images are printed opaquely in color on transparent overlay sheets. A single instant colored photograph of the customer is taken and mounted on a carrier sheet. The customer may select as many appearance modification images as desired. Each overlay sheet, one at a time, overlays the carrier sheet so that the appearance modifiers appear to be on the customer in the photograph. The cost of buying the necessary equipment is a small fraction of what a video-computer systems cost, thereby saving money for the owner of the invention and the customer.

By providing a camera with a scaled viewing guide within which to view the customer through the camera viewfinder, anyone can operate the camera effectively without requiring special expertise. The scaled viewing guide (preferably formed in the shape of an oval for facial photographs) is mounted on the camera viewfinder system to allow for a properly scaled image of the user for accurately fitting the images of proposed changes. Once the photograph has been taken, the worker can leave the customer alone to view appearance modification images overlaying the photograph.

By allowing the customer to view the images alone and in privacy, the customer need not be embarrassed by having anyone else see what the customer looks like with a particular choice of appearance modifiers. The customer may quickly and easily look at as many different possibilities as desired without incurring a cost for each one and without occupying the time of a worker. Each option can be viewed in a matter of seconds simply by overlaying the appearance modifier image on the instant photograph, thereby allowing the customer to view a substantial number of possible choices in a very short period of time.

Using photographically produced images with four-color printing of the appearance modifiers and an instant color photograph of the customer produces visually sharp pictures which give a much clearer image with accurate flesh tones and colors of how the appearance modifier will actually look on the customer. If a photograph is taken of the customer with the appearance modifier as imaged in the system, the photograph produces a much sharper and more accurate image than taking a photograph of a video image.

The present system further allows for pictures and descriptions of related treatment and care products and instructions to be displayed on the same sheet with each appearance modifier to enhance the likelihood of success and satisfaction with proper treatment and care.

Additional information may be displayed on the same sheet including the origins and history of the appearance modifier. Names of famous individuals having a similar image may be added for additional interest.

The entire viewing system with a wide variety of images of appearance modifiers may be combined in a single volume (or different volumes as desired) and stored easily. Easy handling by the customer is also an advantage over bulky and heavy video and computer equipment requiring special care, handling and storage.

By using a ringed binder or other removable-page systems viewing sheets may be removed as new appearance modifiers, such as new hairstyles, replace old ones. Updated overlay pages may be inserted quickly and easily into the ringed binder.

BRIEF DESCRIPTION OF THE DRAWINGS

These and other details and advantages of my invention will be described in connection with the accompanying drawings, which are furnished only by way of Illustration and not in limitation of the invention, and in which drawings.

BEST MODE FOR CARRYING OUT THE INVENTION

Figure 1:
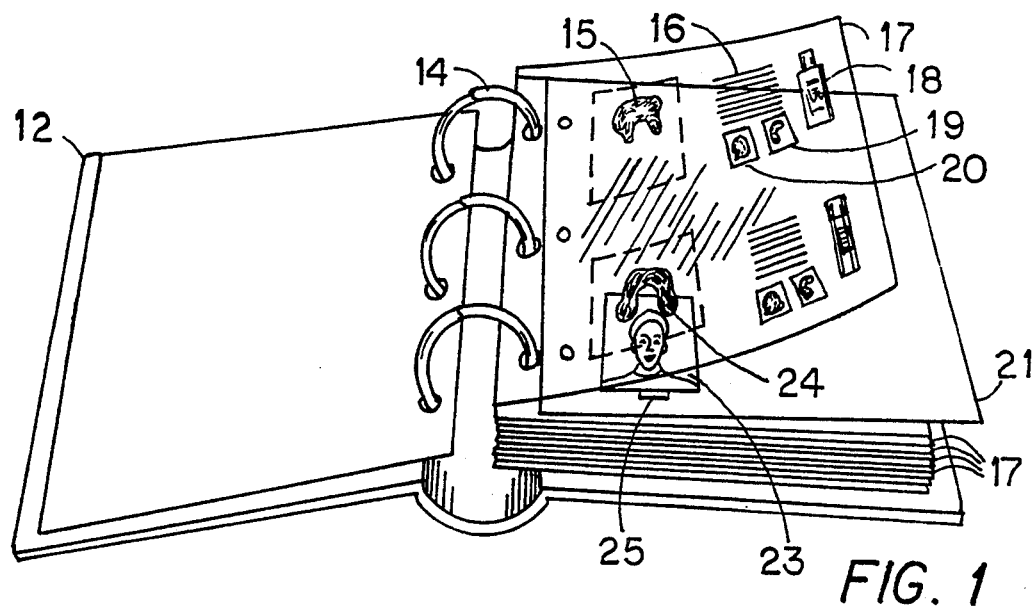
FIG. 1 is a perspective view of the invention with the carrier page bearing the photograph of the user placed in the binder and the modifying image page overlaying the carrier page.

In FIG. 1 a spiral binder 12, overlay sheets 17 and a carrier sheet 21 comprise the viewing components of a system for selecting a desired appearance modifier which best matches a user and for displaying a mutually scaled picture of the user and any of a variety of appearance modifiers.

Photographically produced scaled images of appearance modifiers (in this case hairstyles) 15 and 24 are printed on clear transparent overlay sheets 17 preferably having a matte finish. The image of the appearance modifier is printed using a four-color process on a white opaque backing. Also printed on the overlay sheets may be additional views of the proposed appearance modifier taken at different viewing angles, such as a rear view 20 and a side view 19. Adjacent to the image of the hairstyle on the overlay sheets, at least one image of products 18 related to the pictured appearance modifier and related instructions and information 16 may be printed. Overlay sheets 17 are bound together in a looseleaf binder 12 with openable rings 14 to enable pages to be updated periodically with replacement pages showing new appearance modifiers.

In the preferred embodiment of the invention used to view potential new hairstyles, images of haircare products are displayed to show the user the appropriate product or products to use in caring for his or her new hairstyle. This serves a useful instructive purpose to insure that the user will care for the hairstyle properly and also provides a means for the maker of the product to advertise and the hair salon owner to make additional sales. Other useful information printed on the viewing sheet includes such things as the name of the hairstyle, the creator or origin of the hairstyle, famous people who wear that hairstyle, the types of hair texture which can achieve that hairstyle and what a remedy is to prepare each texture for that hairstyle (i.e. perm, straighten, etc.).

Instructions for creating the hairstyle may be included for the hairstylist, or the instructions may be included in a separate booklet. The style number on the viewing sheet coincides with the style number in the separate booklet for easy reference.

Figure 2:
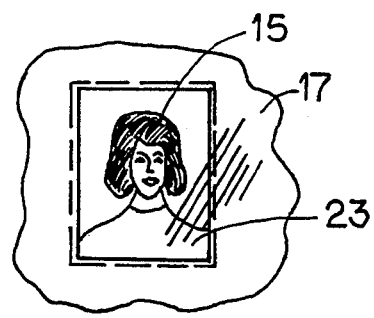
FIG. 2 is a plan view of the modifying image (in this case a hairstyle) overlaying the photograph of the face of the user.

A photographically produced image 233 of the user, scaled to the size of the images of the appearance modifiers, is removably secured by an attaching means 25 such as a Velcro ® fastener to a blank carrier sheet 21. The photograph of the user 23 is positioned low on the carrier sheet 21 to enable the photograph to be moved up to be aligned with multiple images on the overlay sheet while a user might be holding the binder in the lap of the user. Each overlay sheet 17, one at a time, as selected by the user, overlays the carrier sheet 21 such that the appearance modifiers appear to be on the user in the photograph. The carrier sheet 21 slides between two overlay sheets 17 or placed on one overlay sheet with another overlay sheet overlaying the carrier sheet so that the photograph of the user 23 aligns properly with the image of the appearance modifier 24 as seen in FIG. 2. The opaque image of the appearance modifier covers the photograph of the user, so that only the desired portions of the photograph of the user appear through the transparent overlay sheet giving the impression that the appearance modifier is actually on the user. Because the carrier sheet is opaque, it blocks the view of the overlay sheets below the carrier page.

Figure 3:
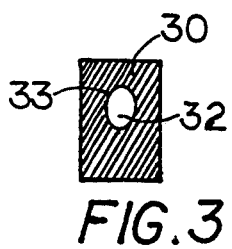
FIG. 3 is an elevational view of a die-cut scaled viewing guide used to outline the face of a user through the viewfinder of the camera.
Figure 4:
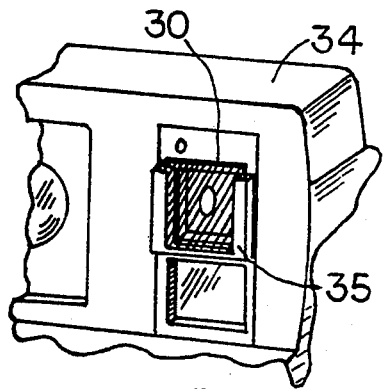
FIG. 4 is a partial perspective view of the camera showing the scaled viewing guide inserted in a slotted U-shaped holder attached to the camera around the viewfinder.
Figure 5:
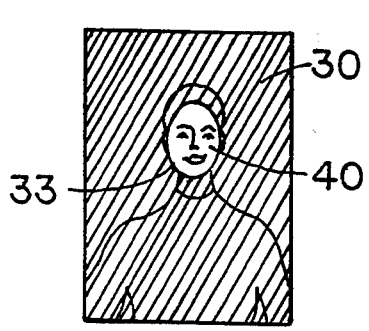
FIG. 5 is a virtual image of the view of a user through the viewfinder of the camera with the oval scaled viewing guide opening defining the face of the user from ear to ear.
Figure 6:
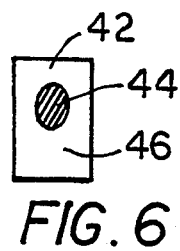
FIG. 6 is an elevational view of a second scaled viewing guide for photographing the image of the appearance modifier having a transparent masking sheet partially shaded on a scaled portion corresponding to the clear scaled portion of the first scaled viewing guide and clear over the remaining portion through which the appearance modifier is viewed.

In FIGS. 3 and 4 a means for photographing a user (preferably a Polaroid ® instant Camera ™ 34) is fitted with a scaled viewing guide 30 in the viewfinder of the photographing means for framing a user through the viewing system to produce a photographically produced image of the user scaled to match the image of the appearance modifiers. The scaled viewing guide comprises a transparent masking sheet 30 partially shaded to leave a clear portion 32 scaled to outline a desired portion of a user viewed through a camera viewfinder. The transparent masking sheet preferably comprises a colored sheet of acetate with the clear scaled portion 32 die cut in a desired shape. In this embodiment an oval 33 is cut in the masking sheet for viewing the face of a user. A U-shaped holder 35 is mounted on a camera in line with the camera viewfinder to receive the masking sheet 30 which slides removably into the U-shaped holder, In FIG, 5 a virtual image through the viewfinder of the camera shows the masking sheet 30 outlining the face of a user 40 with the two sides of the oval 33 coinciding with the two sides of the face of the user adjacent to the user's ears, This positioning is achieved by moving the camera toward or away from the user to make the sides of the oval on the masking sheet line up with the image of the user's ears. In this manner the size of the user's face 23 in the photograph will be scaled to match the size of the image of the hairstyle 15 on the overlay sheet 17.

In FIG, 6 a second scaled viewing guide 42 for photographing the image of the appearance modifier is the reverse of the first scaled viewing guide. The second scaled viewing guide comprises a transparent masking sheet partially shaded on a scaled portion 44 corresponding to the clear scaled portion of the first scaled viewing guide and clear on a remaining portion 46 through which the appearance modifier is viewed. This second viewing guide is used through a camera viewfinder in a manner similar to the first guide for photographing the appearance modifiers by moving the camera to align the second scaled viwing guide with the appearance modifier, A second method for assuring a scaled fit between the image of the appearance modifier and the photograph of the user is to photograph the appearance modifiers all at a constant distance from the camera; a distance calculated to produce an image of the appearance modifier scaled to the photograph of the user created by using the scaled viewing guide.

A third method for assuring a scaled fit between the image of the appearance modifier and the photograph of the user is to adjust the size of the image produced in printing the appearance modifier so that the printed image will always be scaled to fit the photograph of the user created by using the scaled viewing guide.

The images of the appearance modifiers comprise photographs of the appearance modifiers on mannequins against backdrops. Both the mannequins and backdrops are opposite in shade to the appearance modifiers and the mannequins and backdrops are eliminated from the final printed image on each transparent sheet by a shade selection and elimination process used in the printing industry, thereby leaving the "floating" image of the appearance modifier on the clear overlay sheet. In the shade selection and elimination process, images are scanned into a computer and the computer eliminates shades selected by the computer operator. In some delicate work, such as around wisps of hair, detailed work may have to be performed by the computer operator to insure all details of the hair are printed and all other images are eliminated before the image is transmitted to the printer. For creating appearance modifier images of proposed hairstyles, wigs, toupees, and hair transplants, styled wigs and toupees are photographed on mannequin heads.

For viewing these types of appearance modifiers the photograph of the user is made with the actual hair of the user pulled back as far as possible with a head cap, head band, stocking cap or other means of pulling back a user's hair.

In an embodiment of the invention wherein the appearance modifiers are head adornments, facial adornments and facial reconstructions, the images of the appearance modifiers comprise photographs of a variety of head adornments, facial adornments, and facial structures on mannequin heads, This applies to hats, headpieces, make-up, facial reconstruction and other appearance modifiers not involving changes in hairstyle appearance, in such cases the user would be photographed without the user's hair pulled back.

It is understood that the preceding description is given merely by way of illustration and not in limitation of the invention and that various modifications may be made thereto without departing from the spirit of the invention as claimed.

I claim:

1. A system for selecting a desired appearance modifier which best matches a user and for displaying a mutually scaled picture of the user and any of a variety of appearance modifiers, wherein the system for selecting a desired appearance modifier comprises:

photographically produced scaled images of appearance modifiers printed on clear transparent overlay sheets;

means for photographing a user, having a scaled viewing guide in the viewfinder of the photographing means for framing a user through the viewing system to produce a photographically produced image of the user scaled to fit with the image of the appearance modifiers, wherein the scaled viewing guide comprises a transparent masking sheet partially shaded to leave a clear portion scaled to outline a desired portion of a user viewed through a camera viewfinder;

a photographically produced image of the user to the same scale as the images of the appearance modifiers, wherein the image of the user is secured by an attaching means to a blank carrier sheet and each overlay sheet one at a time overlays the carrier sheet such that the appearance modifiers appear to be on the user in the photograph.

2. The invention of claim 1 wherein the masking sheet comprises a tinted sheet of acetate with the clear scaled portion is die cut.

3. The invention of claim 1 further comprising a slotted U-shaped holder mounted on a camera in line with the camera viewfinder to receive the masking sheet which slides removably into the U-shaped holder.

4. The invention of claim 1 further comprising a second scaled viewing guide for photographing the image of the appearance modifier, wherein the second scaled viewing guide comprises a transparent masking sheet partially shaded on a scaled portion corresponding to the clear scaled portion of the first scaled viewing guide and clear on a portion through which the appearance modifier is viewed.

5. The invention of claim 1 wherein the images of the appearance modifiers comprise photographs of the appearance modifiers on mannequins against backdrops, wherein both the mannequins and backdrops are opposite in shade to the appearance modifiers and the mannequins and backdrops are eliminated from the final printed image on each transparent sheet by a shade selection and elimination process.

6. The invention of claim 5 wherein the appearance modifier images comprise photographs of styled wigs on mannequin heads.

7. The invention of claim 6 wherein the appearance modifiers are new hairstyles and the invention further comprises a means for pulling back the user's actual half while being photographed.

8. The invention of claim 6 wherein the appearance modifiers are wigs, toupees, and half transplants, and the invention further comprises a means for pulling back the user's actual hair while being photographed.

9. The invention of claim 5 wherein the appearance modifiers are head adornments, facial adornments and facial reconstructions, and the images of the appearance modifiers comprise photographs of a variety of head adornments, facial adornments, and facial structures on mannequin heads.

10. The invention of claim 1 further comprising, printed on the clear transparent sheets, additional views of the proposed appearance modifier taken at different viewing angles.

11. The invention of claim 1 further comprising adjacent to the image of the hairstyle on the overlay sheet at least one image of products related to the pictured appearance modifier and related instructions and information.

12. The invention of claim 1 wherein the overlay sheet comprises one of a series of pages bound together in a looseleaf binder and pages are updated periodically with replacement pages showing new appearance modifiers, wherein each page bears the image of at least one different appearance modifier, and wherein the carrier sheet is opaque and slides between the overlay sheet pages blocking the view of the pages below the carrier page, 13. The invention of claim 1 wherein the photograph of the user is removably attached to the carrier sheet by a Velcro ® fastening means.

14. A method of selecting an appearance modifier which best matches a user and for displaying a mutually scaled picture of the user and any of a variety of appearance modifiers, wherein the method of selecting an appearance modifier comprises:

photographically producing scaled images of appearance modifiers and printing the images on clear transparent overlay sheets;

photographing a user, by using a scaled viewing guide in the viewing system of the photographing means to frame the user through the viewing system to produce a photographically produced image of the user scaled to match the image of the appearance modifer and securing the photograph of the user by an attaching means to a blank carrier sheet, wherein the scaled viewing guide comprises a transparent masking sheet partially shaded to leave a clear portion scaled to outline a desired oprtion of a user viewed through a camera viewfinder;

overlaying the overlay sheets one at a time on the carrier sheet such that each appearance modifier appears to be on the user in the picture.

15. The invention of claim 14 further comprising photographing the appearance modifiers on mannequins against backdrops, wherein both the mannequins and backdrops are opposite in shade to the appearance modifiers, and eliminating the mannequins and backdrops from the final printed image on the overlay sheet by a shade selection and elimination process.

16. The invention of claim 15 further comprising producing the appearance modifier images by photographing styled wigs on mannequin heads.

17. The invention of claim 16 wherein the appearance modifier is a new hairstyle and the actual hair of the user is pulled back by a means for pulling back hair while the user is being photographed.

18. The invention of claim 17 wherein the appearance modifiers are head adornments, facial adornments and facial reconstructions and the invention further comprises photographing a variety of head adornments, facial adornments and facial structures on mannequin heads.

19. The invention of claim 17 wherein the appearance modifier is a wig and the invention further comprises pulling back the user's actual half using a means for pulling back hair while the user is being photographed.

* * * * *